(12) United States Patent
Campion et al.

(10) Patent No.: US 6,704,485 B1
(45) Date of Patent: Mar. 9, 2004

(54) METHOD FOR REDUCING THE HYDROGEN SENSITIVITY OF OPTICAL FIBERS AT 1380NM-1410 NM

(75) Inventors: Jean-Florent Campion, Conflans St Honorine (FR); Isabelle DeCaux, Mantes la Ville (FR); Philippe Dupont, Levallois Perret (FR); Terry Voots, Hickory, NC (US); José G. Piffaretti, Conover, NC (US); Roger Charlton, Newton, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/933,662

(22) Filed: Aug. 22, 2001

(30) Foreign Application Priority Data

Aug. 25, 2000 (EP) ............................. 00402366

(51) Int. Cl.$^7$ ................................ G02B 6/02
(52) U.S. Cl. ..................................... 385/123
(58) Field of Search ................ 385/123; 65/385, 65/386, 424, 426

(56) References Cited

U.S. PATENT DOCUMENTS

| | | | |
|---|---|---|---|
| 4,515,612 A | | 5/1985 | Burrus, Jr. et al. |
| 4,685,945 A | * | 8/1987 | Freund ........................ 65/426 |
| 5,235,659 A | | 8/1993 | Atkins et al. |
| 5,500,031 A | * | 3/1996 | Atkins et al. .................. 65/386 |
| 6,499,318 B1 | | 12/2002 | Lemaire et al. |

FOREIGN PATENT DOCUMENTS

GB    2 149 392 A    6/1985

OTHER PUBLICATIONS

Chang et al, New Hydrogen Aging Loss Mechanism in the 1400 nm Window, Feb. 21–26, 1999, OFC/IOOC'99 (Optical Fiber Communication Conference and the International Conference on Integrated Optics and Optical Fiber Communications, San Diego CA, USA.*

Database WPI, Section CH, Week 198527, Derwent Publications Ltd., London, GB, Class L101 AN 1985–6751557 XP002159744 corresponding to JP 60 090852 A dated May 22, 1985.

Databases WPI, Section CH, Week 198631, Derwent Publications Ltd., London, GB; Class L01, AN 1986–200691 XP002159745 corresponding to JP 132531 A (Sumitomo Electric Ind Co) dated Jun. 20, 1986.

* cited by examiner

*Primary Examiner*—Euncha Cherry
(74) *Attorney, Agent, or Firm*—Sughrue Mion, PLLC

(57) ABSTRACT

A method for reducing the hydrogen aging loss of silica optical fibers by irreversible reaction of the peroxide defects with deuterium is described. This method comprises the step of contacting the optical fiber with deuterium by exposure to a gas mixture containing deuterium at a temperature compatible with the fiber without exposing the fiber to any further activation, and subsequently the step of degassing the fiber in a neutral atmosphere. The invention relates further to a process of producing optical fibers with low hydrogen aging loss wherein an optical fiber is treated using the method for reducing the hydrogen aging loss. Finally, the invention relates to optical fibers with low hydrogen aging loss obtainable by this process and telecommunication cables produced using these optical fibers. Using the new method, an activation step using intense light and/or elevated temperature is not necessary to achieve the reaction of peroxide defects in silica with deuterium. The process according to the invention allows reaction at temperatures such as the ambient temperature without any further activation.

13 Claims, No Drawings

METHOD FOR REDUCING THE HYDROGEN SENSITIVITY OF OPTICAL FIBERS AT 1380NM-1410 NM

BACKGROUND OF THE INVENTION

The invention relates to optical fibers, and more specifically to long term stability in the transmission properties at 1380–1400 nm of optical fibers used in telecommunication cables.

Optical telecommunication is usually conducted with infrared light in the wavelength ranges of 0.8–0.9 μm or 1.3–1.6 μm. These wavelengths are sufficiently generated by LEDs, laser diodes and suffer least attenuation in the fibers.

A problem associated with operating fibers in this transmission window is the fact that absorption bands occur in this wavelength region. These absorption bands are in particular due to the presence of OH groups.

It was suggested to use highly pure silica with a low hydroxyl content to produce the optical fiber. Optical fibers contain nowadays typically less than 0.1 ppm OH.

However, it has been observed that even fibers of very low hydroxyl silica, when exposed to hydrogen at ambient temperature show an increase in attenuation in the transmission window of 1.3–1.6 μm, and in particular at 1380–1400 nm. This increase of attenuation with time due to the presence of hydrogen is often referred to "hydrogen aging loss".

While diffusion of molecular hydrogen into the fiber also creates absorption bands, the corresponding loss is not permanent and may be removed by degassing.

However, diffusion of molecular hydrogen also leads to irreversible reactions. This type of loss is referred to as permanent.

The hydrogen diffusion is observed even through the fiber cladding, and once the fibers are bundled into telecommunication cables. It is already observed upon exposure during some days to 0.01 atmospheres of hydrogen at ambient temperature. The increment of attenuation due to permanent hydrogen aging loss may be evaluated to 0.02 to 0.12 dB/km at 1383 nm. Exposure to such traces of hydrogen is difficult to avoid. One source of hydrogen may be corrosion phenomena due to the presence of dissimilar metals and moisture in the cable. Also, hydrogen is believed to be produced by some types of silicone upon heating. Optical fibers exposed to seawater and air in particular undergo a large increase of the attenuation with time. The permanent hydrogen aging loss is therefore highly undesirable because it strongly affects the fiber transmission properties Ensuring low attenuation and temporal attenuation stability across the spectral range requires therefore mastering the permanent effects of hydrogen diffusion into the optical fiber.

In order to reduce the loss due to OH absorption bands, it has been proposed in different publications to treat the optical fibers with deuterium in order to replace the hydrogen of OH groups by deuterium either at high temperature or by irradiation.

Isotope exchange between hydrogen and deuterium is reported either at high temperature (above 400° C.) or by irradiation [B. Kumar, "Isotope exchange reactions in vitreous silica", Physics and chemistry of glasses Vol. 26 No6 (1985), 213–216]. During this reaction, the hydrogen of an OH group is replaced by a deuterium. The organic polymers used for the coating of optical fibers do however not in general withstand temperatures necessary for such a reaction. The high temperature process is therefore not usable for reducing the hydrogen aging loss in optical fibers.

U.S. Pat. No. 4,515,612 to Burrus describes a method wherein a thermally induced hydrogen/deuterium exchange is carried out on the optical fiber preform. However, this approach does not prevent attenuation loss due to hydrogen diffusion at a later stage and does thus not ensure reliability during service life time.

U.S. Pat. No. 4,685,945 to Freund describes a method of reacting peroxide linkages existing in the fiber with molecular deuterium ($D_2$) at temperature compatible with the fiber. It is proposed to let the fiber be permeated by the deuterium at a temperature close to the temperature where increased loss or degradation occurs. Simultaneously or subsequently, the reaction with deuterium is stimulated through a light activation step with intense light. The low hydroxyl silica available at that time had a notably larger OH content.

Recently, a new hydrogen aging mechanism has been evidenced ["New hydrogen aging loss mechanism in the 1400 nm window", K. H. Chang, D. Kalish and M. L. Pearsall, Proceedings OFC 1999]. This mechanism involves very reactive defects, a limited number of which exist in an optical fiber. Some of these defects are believed to correspond to peroxide defects, i.e. a deviation in the glass structure due to the insertion of an oxygen atom between a Si—O—Si bond but other defects may be involved in the mechanism These defects may react with molecular hydrogen to yield additional OH groups not present before in the material. Such a mechanism explains the observation of hydroxyl groups in a virtually hydroxyl free silica upon short exposure to hydrogen. Such a process creates new OH groups in the material and has detrimental effects on the attenuation, notably because it gives rise to an increase of the SiOH peak, situated at 1383 nm. The reaction is irreversible ; while further exposure to hydrogen does not lead to further reaction, heating the fiber may not reverse the reaction. The reaction is further fast. A step like increase in attenuation is noted when a fiber is exposed to partial pressures of hydrogen such as 1% for time periods of a few days in ambient conditions. The magnitude and time of onset are highly dependent on the nature of the fiber chosen. The article of K. H. Chang, D. Kalish and M. L. Pearsall discloses this aging mechanism but does not provide any practical suggestion as how to reduce hydrogen aging loss of optical fibers.

BRIEF SUMMARY OF THE INVENTION

The invention addresses the problem of hydrogen aging loss of optical fibers.

According to a preferred embodiment, the gas mixture comprises 0.01 to 100%, preferably 0.5 to 2% of deuterium.

Preferably, the gas mixture further comprises nitrogen.

According to a preferred embodiment, the optical fiber is contacted with the gas mixture during a time period of 1 day to 2 weeks, preferably 3 to 10 days. The temperature of the reaction is preferably from 20 to 40° C.

It is particularly advantageous to carry out the degassing of the reacted optical fiber by maintaining it in air or nitrogen. Preferably, the reacted optical fiber is degassed during a time period of 1 to 3 weeks.

It has been found advantageous to carry out the reaction in a sealable vessel. It is particularly useful if the gas mixture is subsequently recovered from the reaction vessel.

The invention also provides an optical fiber treated by the method according to the invention.

Finally, the invention provides a telecommunication cable comprising such an optical fiber with low hydrogen aging loss.

The invention thus provides a simple method to reduce the hydrogen sensitivity of optical fibers at low cost. It also provides an optical fiber with reduced hydrogen aging loss and enhanced attenuation stability throughout the service life time. It finally provides telecommunication cables containing these fibers which are highly reliable even in difficult environmental conditions.

DETAILED DESCRIPTION OF THE INVENTION

A process according to the invention will be described in more detail, in reference to a preferred embodiment.

The invention is based on the idea that in order to saturate these reactive sites, it is not necessary to provide any particular activation, but that this reaction takes place even at ambient temperature.

During the process according to the invention, and in contrast with the process described in U.S. Pat. No. 4,685,945, no isotope exchange reaction is believed to take place. This is consistent with the fact that no Si—OH defect initial peak absorption decrease occurs during the treatment. Indeed, the method according to the invention is conducted at temperature close to the ambient, and without providing any further energy, whereas the process according to U.S. Pat. No. 4,685,945 provides much more energetic conditions and does not exclude other reactions to some extent.

The method according to the invention comprises a first step, wherein the fiber is exposed to a gas mixture containing deuterium. After a time period sufficient for permeation of deuterium through the entire fiber, the fiber is recovered and left in a neutral atmosphere such as air or nitrogen during another time period for degassing.

Both steps may be conducted at a temperature compatible with the components of the fiber, such as the organic coating material. It is particularly convenient and an advantage of this method that they may be carried out at ambient temperature Thereby, the reactive defects are transformed into OD groups. The reactive sites are thus blocked for further reaction with hydrogen. Because the reaction is irreversible, formation of OH groups may be avoided even on further exposure to hydrogen.

This allows a maximum process output yield of fibers having a stable attenuation, even upon later exposure to hydrogen.

During the process, the fibers may remain on standard shipping spools. No preliminary treatment of the fibers is necessary.

Deuterium being very costly, it is preferred that deuterium be diluted in an inert gas such as nitrogen or argon. A preferred gas mixture comprises 0.01 to 100% of deuterium. Most preferred is a mixture containing 0.5 to 2% of deuterium. Nitrogen is preferably used as inert gas. The most preferred gas mixture of 1% deuterium and 99% of nitrogen.

The fibers are introduced along with a gas mixture containing deuterium in a reaction vessel. The reaction is preferably carried out in a sealable container such as an autoclave. This allows the recovery of the deuterium gas mixture.

The reaction may be conducted at ambient temperature, most preferably from 20 to 40° C.

A convenient way to carry out the reaction is to work under normal pressure. However, it is also possible to pressurize the closed vessel with the gas mixture.

The fibers are maintained in the deuterium containing gas mixture during a time period sufficient for the permeation of the fiber with deuterium present in the gas mixture and its reaction. This time period depends among other factors on the deuterium content of the gas mixture and the temperature. Preferred is a time period of between 1 day to 2 weeks, most preferred being a time period of 3 to 10 days.

After completion of the reaction and before shipping, the optical fiber is extracted and maintained in a neutral atmosphere, such as nitrogen or air, for degassing. During this step, the excess deuterium present throughout the fiber, which equally gives rise to absorption bands, is evacuated.

A preferred time period for the degassing step is 1 to 3 weeks, 2 weeks being particularly preferred. During this time period, the fibers are not exposed to light of high intensity.

The optical fiber thus obtained will show a markedly reduced sensitivity to hydrogen aging loss.

Indeed, the defect sites, which in presence of traces of hydrogen give rise to the formation of Si—OH are irreversibly reacted in Si—OD. The absorption band of the Si—OD vibration is shifted to 1.85 $\mu$m compared with the absorption band of Si—OH at 1.39 $\mu$m. Therefore, the absorption band of the O-D vibration is outside a particularly interesting transmission window situated around 1385 nm and does not affect attenuation in the 1300 nm–1600 nm window.

A low hydroxyl fiber aging test is described in "New hydrogen aging loss mechanism in the 1400 nm window", K. H. Chang, D. Kalish and M. L. Pearsall, Proceedings OFC 1999. Therein, the optical fiber is exposed to 0.01 atmosphere hydrogen for four days and the change in loss at 1385 nm is monitored.

Optical fibers with an initial absorption peak at 1385 nm below 0.350 dB/km produced according to the invention successfully passed the low hydroxyl fiber aging test, i.e. loss at 1385 nm did not change after exposing the fiber to hydrogen for four days.

Optical fibers with low hydrogen aging loss thus produced may then be bundled to telecommunication cables, which meet the standards with regard to reliability in presence of hydrogen.

The method according to the invention is a simple process that allows producing fibers at low cost with reduced hydrogen aging loss, which are compatible with the industrial standards for this type of optical fibers.

What is claimed is:

1. A method for reducing the hydrogen aging loss of an optical fiber, comprising the step of contacting the optical fiber with deuterium by exposure to a gas mixture containing deuterium at ambient temperature without exposing the fiber to any further activation, and the step of degassing the fiber in a neutral atmosphere.

2. The method according to claim 1, wherein the gas mixture comprises 0.01 to 100% of deuterium.

3. The method according to claim 1, wherein the gas mixture further comprises nitrogen.

4. The method according to claim 1, wherein the optical fiber is contacted with the gas mixture during a time period of 1 day to 2 weeks.

5. The method according to claim 1, wherein the temperature of the reaction is from 20 to 40° C.

6. The method according to claim 1, wherein the reacted optical fiber is degassed by maintaining it in air or nitrogen.

7. The method according to claim 1, wherein the reacted optical fiber is degassed during a time period of 1 to 3 weeks.

8. The method according to claim 1, wherein the reaction is carried out in a sealable vessel.

9. The method according to claim 8, wherein the gas mixture is subsequently recovered from the reaction vessel.

10. Optical fiber treated by the method according to claim 1.

11. Telecommunication cable comprising an optical fiber with low hydrogen aging loss according to claim 10.

12. The method according to claim 2, wherein the gas mixture comprises 0.5 to 2% of deuterium.

13. The method according to claim 4, wherein the optical fiber is contacted with the gas mixture during a time period of 3 to 10 days.

* * * * *